Jan. 18, 1966  C. A. DEHNE  3,229,645
POWER AND FREE CONVEYORS
Filed March 12, 1964  2 Sheets-Sheet 1
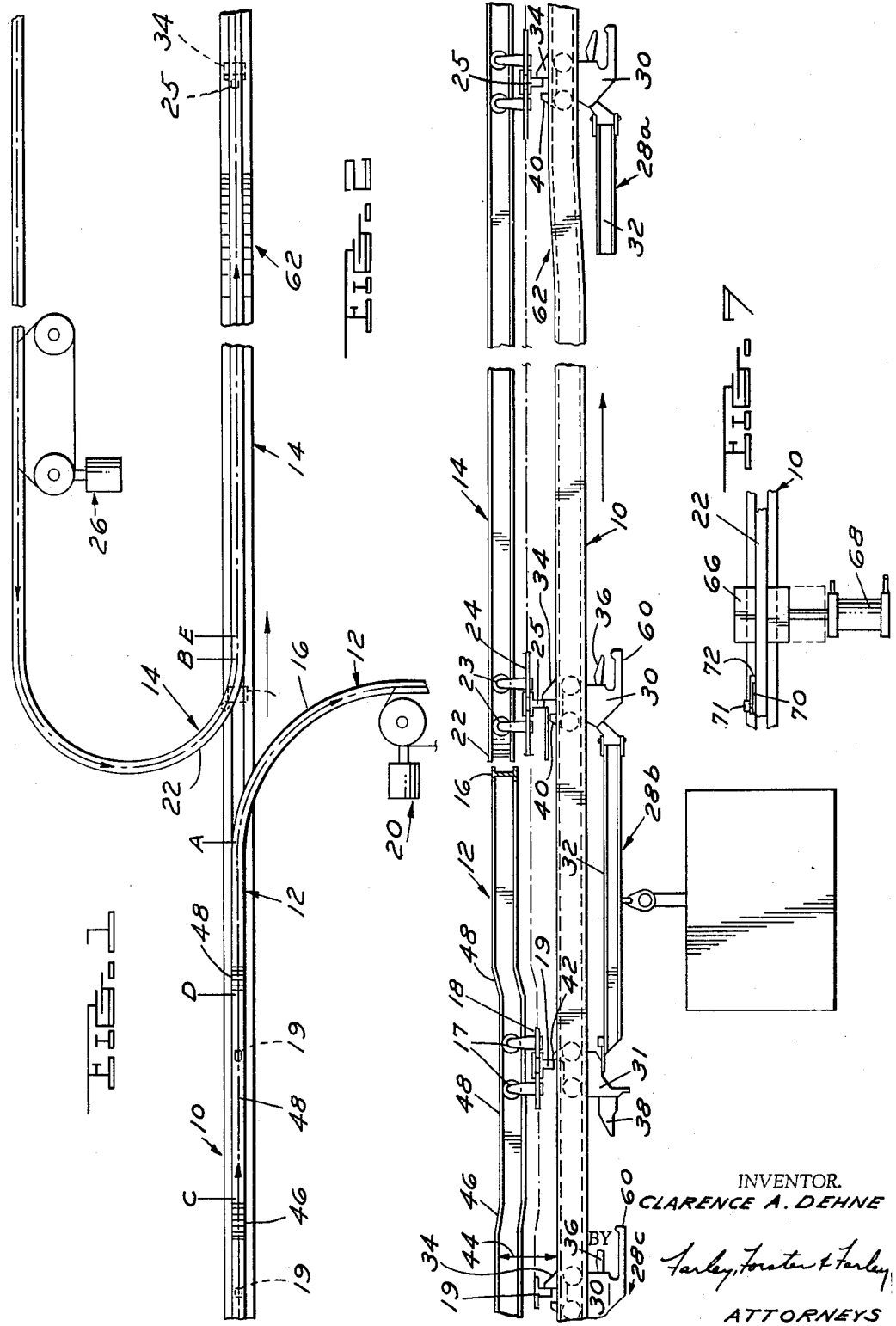
INVENTOR.
CLARENCE A. DEHNE
BY
Farley, Forster & Farley
ATTORNEYS Jan. 18, 1966  C. A. DEHNE  3,229,645

POWER AND FREE CONVEYORS

Filed March 12, 1964  2 Sheets-Sheet 2

INVENTOR.
CLARENCE A. DEHNE
BY
Farley, Forster & Farley
ATTORNEYS

United States Patent Office 3,229,645
Patented Jan. 18, 1966

3,229,645
POWER AND FREE CONVEYORS
Clarence A. Dehne, Louisville, Ky., assignor to Jervis B. Webb Company, Detroit, Mich., a corporation of Michigan
Filed Mar. 12, 1964, Ser. No. 351,465
16 Claims. (Cl. 104—172)

This invention relates to improvements in the construction of power and free conveyors which simplify the transfer of a carrier from a forwarding to a receiving power line and permit the receiving power line to be operated non-synchronously and at a slower speed than the forwarding power line; and, which simplify the stopping of a carrier where desired along a power line.

A conveyor of the power and free type includes a load supporting track, a power track associated therewith supporting an endless propelling member having a number of pusher members mounted at spaced intervals thereon and projecting toward the load supporting track, and a carrier on the load supporting track having a driving dog projecting toward the power track for engagement by a pusher thereof.

Carriers of power and free conveyors have conventionally been equipped with a driving dog and a holdback dog each of the one-way type, and both projecting toward the power line so that a pusher thereof extends between the two dogs and is trapped. In effect the carrier then becomes locked to the pusher and this is a preferred arrangement because the positions of carriers along a power line is positively established.

According to the present invention, a conveyor of the type including a load track, a power track adjacent thereto supporting an endless propelling member having pushers projecting toward the load track, and a carrier on the load track having movable one-way driving and holdback dogs projecting toward a power track to trap a pusher, is characterized by the holdback dog projecting toward the power track a distance less than that of the driving dog, and means for changing the spacing between the load and power tracks from a normal spacing in which a pusher overlaps both the driving and holdback dogs to an increased spacing in which a pusher overlaps the driving dog but not the holdback dog.

Several advantages result from this relation between the driving and holdback dogs and the spacing between the load and power tracks. At a transfer station where a load track is arranged in converging relation with a receiving power track, and having means for forwarding a carrier into a position for engagement of its driving dog by a pusher of the receiving power line, the receiving power track and load track are mounted at said increased spacing at said carrier position. Since there can be no engagement between a pusher and the holdback dog at the increased track spacing there is no necessity to synchronize the rate of carrier and pusher movement and relative position in order to prevent interference between the holdback dog and a pusher, even in a case where the carrier is moving faster than the pusher of the receiving power line at the time of transfer.

Where the conveyor includes a transfer station at which a receiving power track and the load track converge laterally, the tracks are arranged at said increased spacing and a driving dog deflector is mounted at the area of convergence of the tracks, said deflector including a surface which extends into the path of travel of the driving dog at a level above the path of travel of the holdback dog, and thus the deflector automatically depresses a driving dog to a position of clearance from lateral engagement by a receiving pusher and is not engaged by the holdback dog.

Where the conveyor includes a station at which a carrier may be halted by a carrier stopping device, the load and power tracks are arranged at said station at the increased spacing and the stopping device may simply include a stop plate with means for moving the stop plate between block and non-blocking positions, the stop plate in blocking position extending into the path of travel of the driving member and holdback dog below the path of travel of a pusher and having a portion which overlies and holds the driving dog in non-driving position when the stop plate is engaged by the holdback dog. Where the carrier is equipped with a supplementary driving dog, the supplementary driving dog projects toward the power track a distance less than the holdback dog, and the stop plate in blocking position lies above the path of travel of the supplementary driving dog. The result is not only to simplify the construction of a stopping device, but also to render its operation much less critical and more foolproof because the stop plate can only be engaged by one dog of a carrier, that is, the holdback dog.

Other features and advantages of the invention will appear from the following description of the representative construction disclosed in the accompanying drawings in which:

FIGURE 1 is a plan view schematically illustrating a transfer station of a power and free conveyor at which a carrier is transferred under power from a forwarding power line to a receiving power line;

FIGURE 2 is a side elevation of the structure shown in FIG. 1;

FIGURE 7 is a schematic plan view of the carrier stopping device of FIG. 3.

Figure 3:
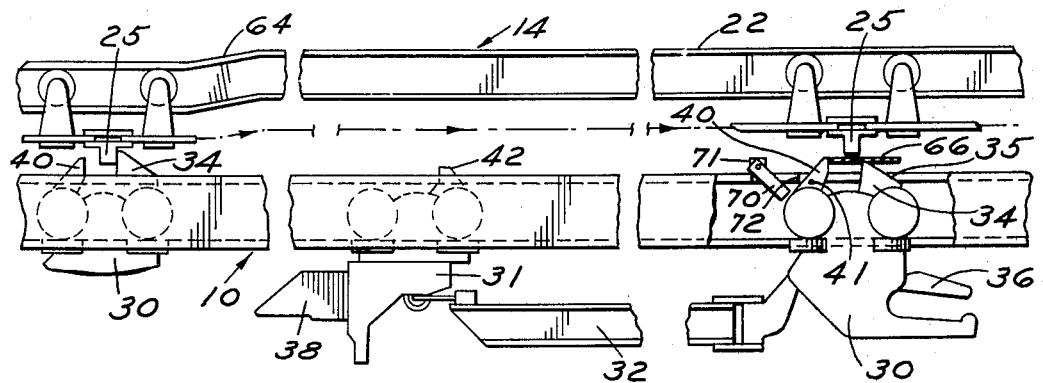
FIGURE 3 is a side elevation, on an enlarged scale, showing the relation between a pusher of a power line, the driving and holdback dogs of a carrier and a stopping device at the increased track spacing.

Referring to FIGS. 1 and 2, a conventional double-channel load track 10 of an overhead power and free conveyor extends through a transfer zone from a forwarding power line 12 to a receiving power line 14. The forwarding power line 12 includes an I-beam power track 16 which supports trolleys 17 connected to an endless chain 18 provided with pushers 19, the chain being driven by a drive unit 20. The receiving power line 14 includes an I-beam power track 22 which supports trolleys 23 connected to an endless chain 24 provided with pushers 25, the chain 24 being propelled by a drive unit 26. Carriers 28a, 28b and 28c travel on the load track 10.

Each carrier includes a forward trolley 30, a rear trolley 31 and a load bar 32 pivotally connected to each trolley. The forward trolley 30 is equipped with a main one-way driving dog 34 which is movable downwardly to a non-driving position either upon engagement between its sloping forward face 35 (FIG. 3) and an object in the path of travel, or by engagement between a releasing lever 36 on the forward trolley 30 and a rearwardly extending probe 38 on the rearward trolley 31 of a preceding carrier. Adjacent and to the rear of the main driving dog 34, the forward trolley 30 is equipped with a one-way holdback dog 40 connected to the trolley body by a pivot 41 (FIG. 3) and the holdback dog is constructed so as to project toward the power track a distance less than the driving dog 34. Each rear trolley 31 is provided with a supplementary driving dog 42 which projects toward the power track a distance less than that of the driving and holdback dogs of the leading trolley 30.

At a "normal" spacing between the load track and the power track, such as is best illustrated at the left side of FIG. 3, the distance between the tracks is such that a pusher 25 of the power line extends between and is overlapped by both the driving and holdback dogs thus providing a positive interlock between a carrier and a pusher, but does not overlap the supplementary driving dog 42. At a "wide" spacing between the load and the power track, a pusher 25 overlaps and engages only the main driving dog 34 of a carrier. Both the holdback dog 40 and the supplementary driving dog 42 clear the path of travel of a pusher at this spacing. At a "tight" spacing between the load track and a power track such as illustrated at the left side of FIG. 2, a pusher may overlap and engage all three dogs of a carrier.

Referring to FIGS. 1 and 2, the forwarding power line 12 approaches the transfer station above the load track 10 and then diverges laterally from the load track at location A.

Initially the load track 10 and forwarding power track 16 are arranged at normal spacing as indicated by the arrow 44 at the left side of FIG. 2. At a distance in advance of location A an amount greater than the longitudinal distance between the main and supplementary carrier drive dogs 34 and 42, the forwarding power track 16 is provided with a drop section 46 which places the tracks in tight spacing, followed by a rise section 48 which returns the tracks to normal spacing. Between the drop and rise sections 46 and 48, a pusher 19 of the forwarding power line is engageable with the supplementary drive dog 42 of a carrier.

The receiving power line 14 converges laterally on the load track 10 at location B, FIG. 1, with the receiving power track 22 and load track 10 being arranged in wide spacing so that a pusher 25 of the receiving power line can only engage the main driving dog 34 of a carrier. The distance between locations B and D is less than the distance between the main and supplementary dogs 34 and 42 of a carrier. To further illustrate the invention, it will be assumed that the receiving power line is driven by the drive unit 26 at a speed slower than is the forwarding power line.

Figures 4, 5:
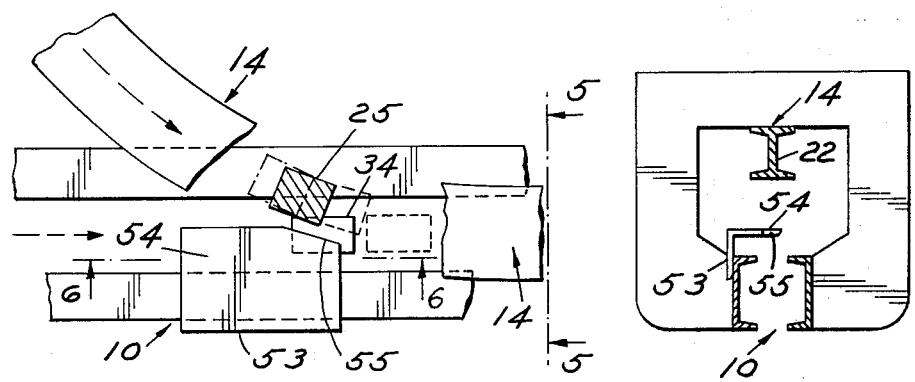
FIGURE 4 is a schematic plan view of the junction between a receiving power line and a load track.
FIGURE 5 is a sectional elevation taken as indicated by the line 5—5 of FIG. 4.
Figure 6:
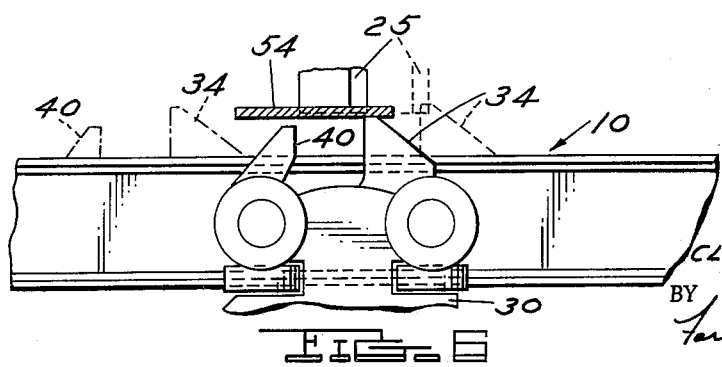
FIGURE 6 is a sectional elevation taken as indicated by the line 6—6 of FIG. 4.

A transfer operation may be briefly described as follows: A carrier, such as the carrier 28b, FIG. 2, is advanced along the forwarding power line 12 to location A where the forwarding power and load tracks diverge and a pusher 19 loses engagement with the main carrier drive dog 34. At this time the supplementary drive dog 42 of the carrier will be at position C, FIG. 1, will be engaged by the next following pusher, and the carrier will be advanced until the supplementary dog and pusher reach the rise section 48, where the pusher disengages from the supplementary driving dog 42 at position D, FIG. 1. When the supplementary driving dog 42 of a carrier is in position D, the main driving dog 34 of that carrier has been advanced to position E, FIG. 1, where it is engageable by the first on-coming pusher 25 of the receiving power line. In the event such a pusher 25 had reached position B, FIG. 1, prior to the main carrier drive dog 34, the drive dog would merely be advanced beneath the pusher, automatically retracting and would be picked up when overtaken by the pusher. No interference would take place even though the carrier is moving at a faster speed than the receiving power line 14 and even though there is no synchronization provided between the relative position of a carrier and that of a receiving pusher, due to the fact that with the receiving power line and load track arranged in wide spacing, there can be no engagement between a pusher and the holdback dog.

Where the load track and receiving power track converge laterally at constant elevation as shown, there could be interference between a receiving pusher and a main driving dog if both simultaneously reached the area of convergence. Such a condition, along with a device of the present invention for automatically preventing it, is illustrated in FIGS. 4–6. In FIG. 4 a main driving dog 34 and receiving pusher 25 are illustrated in various possible relative positions at the area of convergence of the receiving power line 14 and load track 10, illustrating that it is possible for a receiving pusher 25 to engage the side of a driving dog 34 and create a jamming condition. This is automatically prevented by a driving dog deflector, consisting simply of an angle section member having an upstanding leg 53 (FIG. 5), secured to one rail of the load track 10 at the area of convergence between the load track and receiving power line, and having a horizontal surface 54 which extends into the path of travel of the main drive dog 34 at a level above the path of travel of the holdback dog 40 as shown in FIG. 6. The upper surface 54 of the deflector is provided with a chamfered corner 55 (FIG. 4) so that the surface 54 is in clearance relation with the path of travel of the receiving pusher 25. Thus the deflector automatically depresses each passing driving dog 34 to a position of clearance from lateral engagement by a receiving pusher 52 as shown in FIG. 6.

For some distance following the area of convergence between the load track and the receiving power line, the receiving power track and load track continue in wide spaced relation and the tracks are then brought back to normal spacing, as by the use of a rise section 62 in the load track 10. The length of this section where the tracks are in wide spacing is determined from an analysis of all factors involved in a particular transfer operation. These factors include the speed and distance between the pushers of both the forwarding and receiving power lines, the length of a carrier and the distance between its driving dogs, the length of the tight track section between the load track and forwarding power track in advance of the transfer zone and the possibility of the forwarding power line to be operating when the receiving power line is stopped. All of these factors can possibly have an effect upon the maximum distance a carrier can be advanced along the receiving power line by the forwarding power line, and the length of the wide spaced track section which follows the junction of the load and receiving power tracks must be in excess of this distance so as to eliminate any possibility of a jam caused by a faster moving holdback dog engaging a slower moving pusher of the receiving power line.

An improved carrier stop construction is shown in FIGS. 3 and 7. In FIG. 3, the leading trolley 30 of the carrier at the left-hand side of the view is being propelled by pusher 25 with the load and power tracks in normal spaced relation. To install a stop, the spacing between the power and load tracks is increased from normal to wide spacing as by providing a rise section 64 in the power line 14 and a stop plate 66 is installed between the power track 22 and load track 10 and is connected to an air cylinder 68, or other suitable actuating device, which enables the stop plate 66 to be moved between a blocking and a non-blocking position.

The stop plate in blocking position extends into the path of travel of the driving dog 34 and holdback dog 40 below the path of travel of pusher 25 and above the path of travel of the supplementary driving dog 42. The stop plate is made long enough in the direction of carrier travel to have a portion which overlies and holds the driving dog in non-driving position when the stop plate 66 engages the face of the holdback dog 40. An antibackup arm 70, pivotally secured to a bracket 71, is mounted so as to depend through a notch 72 cut in the upper flange of one of the load tracks 10 so that the arm 70 pivots upwardly out of the way when engaged by a forwardly moving trolley and falls down to a blocking position in which it prevents the trolley from backing up or rebounding when the holdback dog 40 contacts the stop plate 66.

This stop construction is very simple and effective, and because of its relation to the track spacing and the relative heights of the driving, holdback and supplementary driving dogs of a carrier, operation of the stop is practically fool-proof and need not be precisely timed or synchronized with carrier movement. The only part of the carrier which the stop can engage in blocking relation is the holdback dog 40.

While preferred embodiments have been described above in detail, it will be understood that numerous modifications might be resorted to without departing from the scope of the invention as defined in the following claims.

I claim:

1. A conveyor of the type including a load track, a power track adjacent thereto supporting an endless propelling member having pushers projecting toward the load track, and a carrier on the load track having movable one-way driving and holdback dogs projecting toward the power track to trap a pusher, characterized by the holdback dog projecting toward the power track a distance less than that of the driving dog, and a track section along which the spacing between the load and power tracks is changed from a normal spacing in which a pusher overlaps both the driving and holdback dogs to an increased spacing in which a pusher overlaps the driving dog but not the holdback dog.

2. A conveyor as claimed in claim 1 wherein the load track is arranged in converging relation with a receiving power track at a transfer station, means for forwarding a carrier into a position for engagement of its driving dog by a pusher of the receiving power track, the receiving power track and load track being mounted at said increased spacing at said carrier position.

3. A conveyor as claimed in claim 1 further including a transfer station at which a receiving power track and a load track converge laterally at said increased spacing, and a driving dog deflector mounted at the area of convergence in clearance relation with a pusher of the receiving power track, said deflector including a surface which extends into the path of travel of the driving dog at a level above the path of travel of the holdback dog, whereby said deflector depresses a driving member to a position of clearance from lateral engagement by a receiving pusher.

4. A conveyor as claimed in claim 1 further characterized by a carrier stopping device, means mounting the stopping device at a location where the load and power tracks are arranged at said increased spacing, the stopping device including a stop plate and means for moving the stop plate between blocking and non-blocking positions, the stop plate in blocking position extending into the path of travel of the driving dog and holdback dog below the path of travel of a pusher and having a portion which overlies and holds the driving dog in non-driving position when the stop plate is engaged by the holdback dog.

5. A conveyor as claimed in claim 4 further characterized by a carrier having a supplementary driving dog projecting toward the power track a distance less than that of the holdback dog, said stop plate in blocking position lying above the path of travel of the supplementary driving dog.

6. A conveyor as claimed in claim 4 further characterized by means for preventing the carrier from rebounding to a position in which the driving dog is not held in non-driving position by the stop plate.

7. In a power and free conveyor system a construction for transferring a carrier from a pusher of a forwarding power line to a pusher of a receiving power line comprising:

(a) a load track on which the carrier is supported;
(b) a transfer zone at which the forwarding power line and the receiving power line respectively diverge from and converge on the load track;
(c) the carrier having a movable one-way driving member projecting toward a power line, a holdback dog positioned so that a pusher can extend between the driving member and holdback dog, the holdback dog projecting toward a power line a distance less than that of the driving member; and
(d) the receiving power line at the transfer zone being spaced from the load track so that a pusher of the receiving power line overlaps the driving member but not the holdback dog.

8. A power and free conveyor system as claimed in claim 7 further comprising: a driving member deflector mounted at the area of convergence between a carrier driving member and a receiving power line pusher, the deflector being in clearance relation with the receiving pusher and having a portion which extends into the path of travel of a driving member above the path of travel of the holdback dog.

9. A power and free conveyor system as claimed in claim 7 further comprising a section in the receiving power line following the transfer zone along which the spacing between the receiving power line and the load track is decreased so that a pusher of the receiving power line overlaps both the driving member and the holdback dog of a carrier.

10. A power and free conveyor system as claimed in claim 7 further comprising means for non-synchronously driving the forwarding and receiving power lines with the receiving power line running at a slower rate than the forwarding power line.

11. A power and free conveyor system as claimed in claim 7 wherein said means for propelling the carrier from the forwarding to the receiving power line includes a supplementary drive dog mounted on the carrier in trailing relation to said driving member, the distance between the driving member and supplementary drive dog along the load track at the transfer zone being greater than the distance between the area of divergence of the forwarding power line with the load track and the area of convergence of the receiving power line with the load track.

12. A power and free conveyor system as claimed in claim 11 wherein said supplementary drive dog projects toward a power line a distance less than said holdback dog, the forwarding power line being provided with a section in advance of the transfer zone along which the spacing between the forwarding power line and the load track is decreased an amount sufficient to enable a forwarding pusher to engage said supplementary drive dog, the length of said section exceeding the distance between the area of divergence of the forwarding power line with the load track and the area of convergence of the receiving power line with the load track.

13. A conveyor of the type including a load track, a power track adjacent thereto supporting an endless propelling member having pushers projecting toward the load track, a carrier on the load track having movable one-way driving and holdback dogs projecting toward the power track to trap a pusher, and a transfer station at which the carrier is forwarded along the load supporting track to a converging power track of a receiving power line for engagement between a pusher of the receiving power line and the driving dog of the carrier; characterized by means for enabling such engagement of receiving pusher and driving dog to be obtained independently of the relative speed and position between the receiving pusher and carrier driving dog comprising the holdback dog being arranged to project toward the receiving power line a distance less than that of the driving dog, the receiving power line at the transfer zone being spaced from the load track a distance such that a pusher of the receiving power line overlaps the driving dog of the carrier but not the holdback dog thereof, and a section following the transfer zone along which the spacing between the receiving power line and load track is decreased an amount sufficient to position a pusher in overlapping relation with the carrier driving member and holdback dog.

14. A conveyor as claimed in claim 13 further comprising a driving dog deflector mounted at the area of convergence between a carrier driving dog and a receiving power line pusher, the deflector being in clearance relation with the receiving pusher and having a portion which extends into the path of travel of a driving dog above the path of travel of the holdback dog.

15. A conveyor trolley of the type having movable one-way driving and holdback dogs adapted to trap a pusher of a propelling member characterized by the driving dog having a length greater than that of the holdback dog in an amount sufficient for overlapping driving engagement between a pusher and the driving dog with no overlapping relation between the pusher and the holdback dog.

16. In a power and free conveyor system a construction for transferring a carrier from a forwarding power line to a receiving power line comprising:

(a) a load track on which the carrier is supported;

(b) a transfer zone at which the forwarding power line and the receiving power line respectively diverge from and converge on the load track;

(c) pusher and driving means on the power lines and carrier comprising the combination of a single member and a pair of movable one-way driving and holdback members projecting oppositely to the single member for normal overlapping relation therewith along the forwarding power line, the holdback member projecting a distance less than that of the driving member; and (d) the receiving power line at the transfer zone being spaced from the load track so that said single member is overlapped by the driving member but not by the holdback member.

References Cited by the Examiner
UNITED STATES PATENTS 948,678    2/1910    Bighouse _____ 104—172

ARTHUR L. LA POINT, *Primary Examiner.*